United States Patent [19]

Welles, II et al.

[11] Patent Number: 5,691,980

[45] Date of Patent: Nov. 25, 1997

[54] LOCAL COMMUNICATION NETWORK FOR POWER REDUCTION AND ENHANCED RELIABILITY IN A MULTIPLE NODE TRACKING SYSTEM

[75] Inventors: Kenneth Brakeley Welles, II, Scotia; Jerome Johnson Tiemann, Schenectady, both of N.Y.; Sandeep Chennakeshu, Cary, N.C.; Harold Woodruff Tomlinson, Jr., Scotia, N.Y.

[73] Assignee: General Electric Company, Schenectady, N.Y.

[21] Appl. No.: 484,750

[22] Filed: Jun. 7, 1995

[51] Int. Cl.⁶ .................................................. H04B 7/185

[52] U.S. Cl. ........................ 370/316; 340/989; 340/992; 342/457; 455/54.1

[58] Field of Search .................................. 370/95.1, 95.2, 370/85.7, 85.8, 316; 340/933, 988, 989, 991, 992, 993; 455/33.1, 33.2, 54.1; 342/450, 457

[56] References Cited

U.S. PATENT DOCUMENTS

| | | | |
|---|---|---|---|
| 4,682,326 | 7/1987 | Ulug | 370/89 |
| 5,210,753 | 5/1993 | Natarajan | 370/95.1 |
| 5,212,806 | 5/1993 | Natarajan | 455/33.2 |
| 5,225,842 | 7/1993 | Brown et al. | 342/357 |
| 5,355,511 | 10/1994 | Hatano et al. | 455/11.1 |
| 5,379,224 | 1/1995 | Brown et al. | 364/449 |
| 5,453,977 | 9/1995 | Flammer, III et al. | 370/95.2 |
| 5,479,410 | 12/1995 | Paavonen | 370/95.3 |
| 5,526,357 | 6/1996 | Jandrell | 370/95.2 |
| 5,548,296 | 8/1996 | Matsuno | 342/457 |

FOREIGN PATENT DOCUMENTS

09415413  7/1994  WIPO.

*Primary Examiner*—Douglas W. Olms
*Assistant Examiner*—Min Jung
*Attorney, Agent, or Firm*—Marvin Snyder

[57] ABSTRACT

A mobile local area network (LAN) of tracked assets utilizing minimal power and bandwidth allows a large number of assets to be tracked in a practical manner. The mobile LAN is established between a plurality of tracking units in close proximity. Assets are approximately located according to their connection in the mobile LAN where the exact location of at least one of the network nodes is known. Each tracked asset has capability to independently determine and report its position to a central station, and each asset also has capability to communicate locally with other cooperative assets via the LAN. The LAN is dynamically reconfigurable so that as other cooperative assets come into proximity, they can join the network, and as others move away, they can leave the network. Within the network, a protocol is followed which assigns one of the assets to be the "master" and all others to be "slaves". The master asset takes responsibility for determining its own exact geographical position via LORAN, OMEGA, Global Positioning System (GPS) or other navigational aid. When connected in a LAN, slave assets report their ID to the master asset and do not determine their own locations in order to conserve power. The master reports its location and ID, as well as the IDs of the other assets in the LAN, to the central station. Uncertainty in the location of a slave asset is limited by the known possible geographical extent of the LAN which is known a priori.

11 Claims, 8 Drawing Sheets fig. 1 fig. 2 fig. 3 fig. 4 fig. 5 fig. 6 fig. 7 fig. 8

LOCAL COMMUNICATION NETWORK FOR POWER REDUCTION AND ENHANCED RELIABILITY IN A MULTIPLE NODE TRACKING SYSTEM

BACKGROUND OF THE INVENTION

1. Field of the Invention

This invention relates to asset tracking and, more particularly, to tracking of assets, including goods and vehicles, using the Global Positioning System (GPS). While goods are an example of assets that need to be tracked, the cargo containers, container trucks and railcars in which the goods are shipped are themselves assets which need to be tracked.

2. Description of the Prior Art

Goods shipped from a manufacturing plant, warehouse or port of entry to a destination are normally tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods. However, during transit, there sometimes is a need to know the location and position of the goods. Knowledge of the location of goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to track such vehicles. In the case of railcars, passive radio frequency (RF) transponders mounted on the cars have been used to facilitate interrogation of each car as it passes a way station and supply the car's identification. This information is then transmitted by a radiated signal or land line to a central station which tracks the locations of cars. This technique, however, is deficient in that while a particular railcar remains on a siding for an extended period of time, it does not pass a way station. Moreover, way station installations are expensive, requiring a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation. Typically, a mobile tracking unit includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the tracking unit may include a suitable electromagnetic emitter for transmitting to a remote location the vehicle's location data and other data acquired from sensing elements on board the vehicle. Current methods of asset localization require that each item tracked be individually equipped with hardware which determines and reports location to a central station. In this way, a tracked asset is completely "ignorant" of other assets being shipped or their possible relation to itself. In reporting to the central station, such system requires a bandwidth which scales approximately with the number of assets being reported. The aggregate power consumption over an entire such system also scales with the number of assets tracked. Further, since both the navigation set and the emitter are devices which, when energized, generally require a large portion of the overall electrical power consumed by the mobile tracking unit, it is desirable to control the respective rates at which such devices are respectively activated and limit their respective duty cycles so as to minimize the overall power consumption of the mobile tracking unit.

Most current asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite-based truck tracking system developed by Qualcomm Inc., known as OMNITRACS, is in operation in the United States and Canada. This system requires a specialized directional antenna and considerable power for operation, while vehicle location, derived from two satellites, is obtained with an accuracy of about one-fourth kilometer. A rail vehicle positioning system described in U.S. Pat. No. 5,129,605 to Burns et al. is installed on the locomotive of a train and uses, to provide input signals for generating a location report, a GPS receiver, a wheel tachometer, transponders, and manual inputs from the locomotive engineer. The rail vehicle positioning system of Burns et al. is not readily adaptable to use of battery power and, therefore, is unsuitable for applications which are not locomotive-based.

SUMMARY OF THE INVENTION

It is therefore an object of the present invention to provide a local area network of tracked assets which utilizes minimal power and bandwidth so as to allow a large number of assets to be tracked in a practical manner.

In accordance with the invention, a mobile local area network (LAN) is established among a plurality of mobile tracking units in close proximity. Assets are approximately located according to their connection in the mobile LAN where the exact location of at least one network node is known. Each tracked asset may have the capability to independently determine and report its location to a central station, and each asset also has the capability to communicate locally with other cooperative assets via the LAN. Because of the inherent mobility of the tracked assets, the LAN is a wireless network preferably using low power spread spectrum transceivers. The LAN is dynamically reconfigurable so that as other cooperative assets come into proximity, they can join the network, and as others move away, they can leavet the network.

Within the network, a protocol is established which assigns one of the assets to be the "master" and all others to be "slaves". The master asset takes the responsibility of determining its own exact geographical position. This may be done via LORAN, OMEGA, Global Positioning System (GPS) or other navigational aid. When operating in a LAN, slave assets report their identification (ID) to the master asset according to the local protocol and do not determine their own location in order to conserve power. The master reports to the central station its location and ID, as well as the ID of each of the other assets in the LAN. The central station can then know that the assets associated with each ID are within the communication range of the geographical position reported by the master. Uncertainty in the location of a slave asset is limited by the known possible geographical extent of the LAN, which is known a priori.

In one preferred embodiment of the invention, a railcar location and tracking system is comprised of independent mobile tracking units affixed to railroad freight cars. These tracking units are battery powered and have Global Positioning Satellite (GPS) receiving and communication transmitting capabilities. The units have an extremely low power radio data link between units on the freight cars which are in close proximity (about 1 km). This radio link allows units which are part of the same train to share information. Sharing information allows use of a single GPS receiver and a single communications transmitter. Since the GPS receiving and communications transmitting functions are the most power consuming tasks performed by the units, this sharing of information reduces the average power consumed by the units on the train. System reliability is significantly enhanced by allowing units with inoperative GPS receivers or communications transmitters to continue to provide location and tracking information through the LAN.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
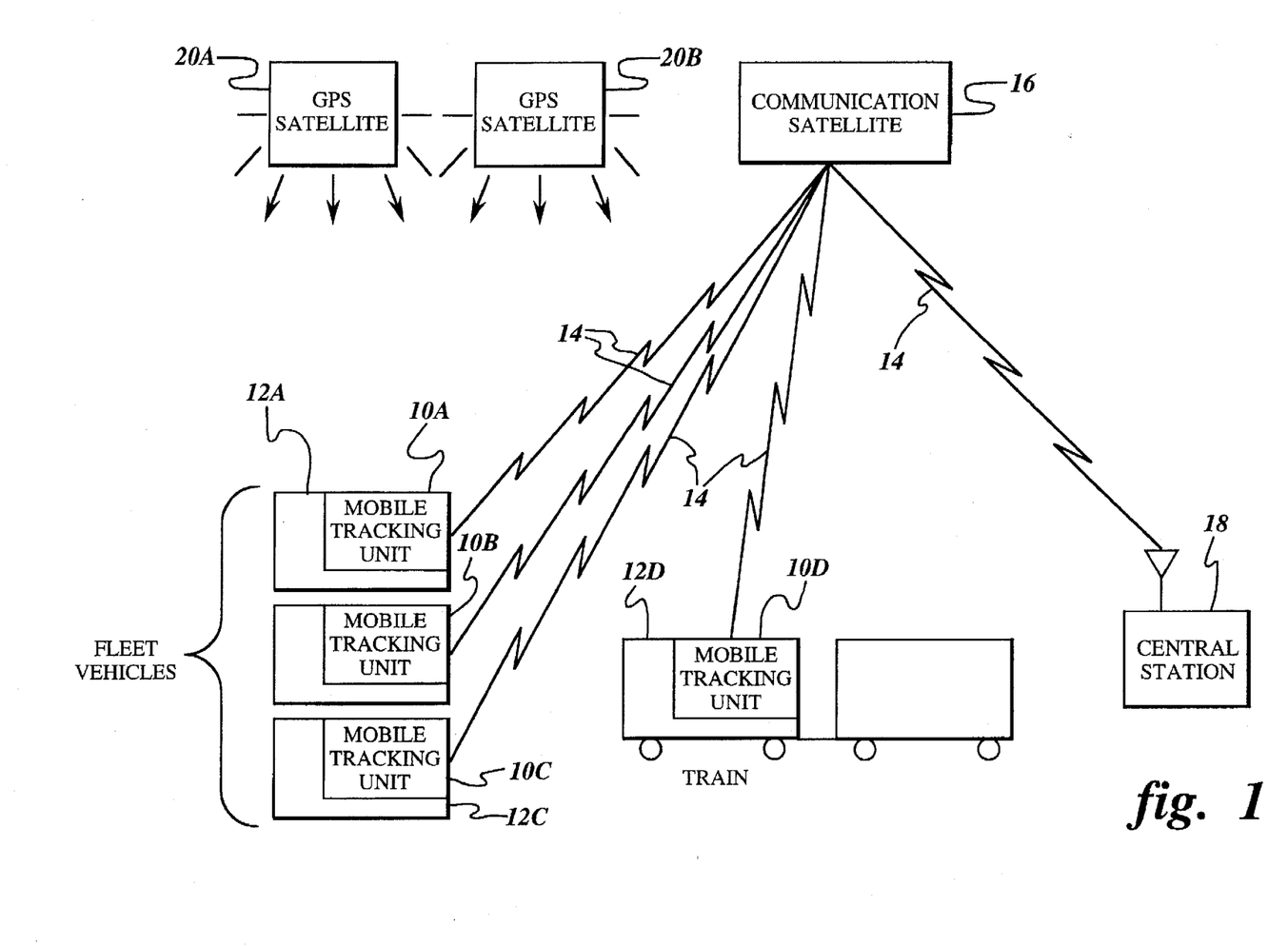
FIG. 1 is a block diagram of an exemplary asset tracking system which employs independent mobile tracking units in accordance with the present invention.

FIG. 1, illustrates mobile tracking units which employ navigation signals from a GPS satellite constellation, although, as suggested above, other navigation systems can be used in lieu of GPS. A set of mobile tracking units 10A–10D are installed in respective cargo-carrying conveyances, such as vehicles 12A–12D, which are to be tracked or monitored. A communication link 14, such as a satellite communication link through a communication satellite 16, can be provided between each mobile tracking unit (hereinafter collectively designated as 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to remote central station) or two-way. In a two-way communication link, messages and commands can be sent to the tracking units, thereby further enhancing reliability of the communication. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudo-random sequences which allow users to determine location on the surface of the earth (within approximately 100 feet), velocity (within about 0.1 MPH), and precise time information. GPS is a particularly attractive navigation system to employ, being that the respective orbits of the GPS satellites are chosen so as to provide world-wide coverage and being that such highly-accurate radio signals are provided free of charge to users by the U.S. government.

Figure 2:
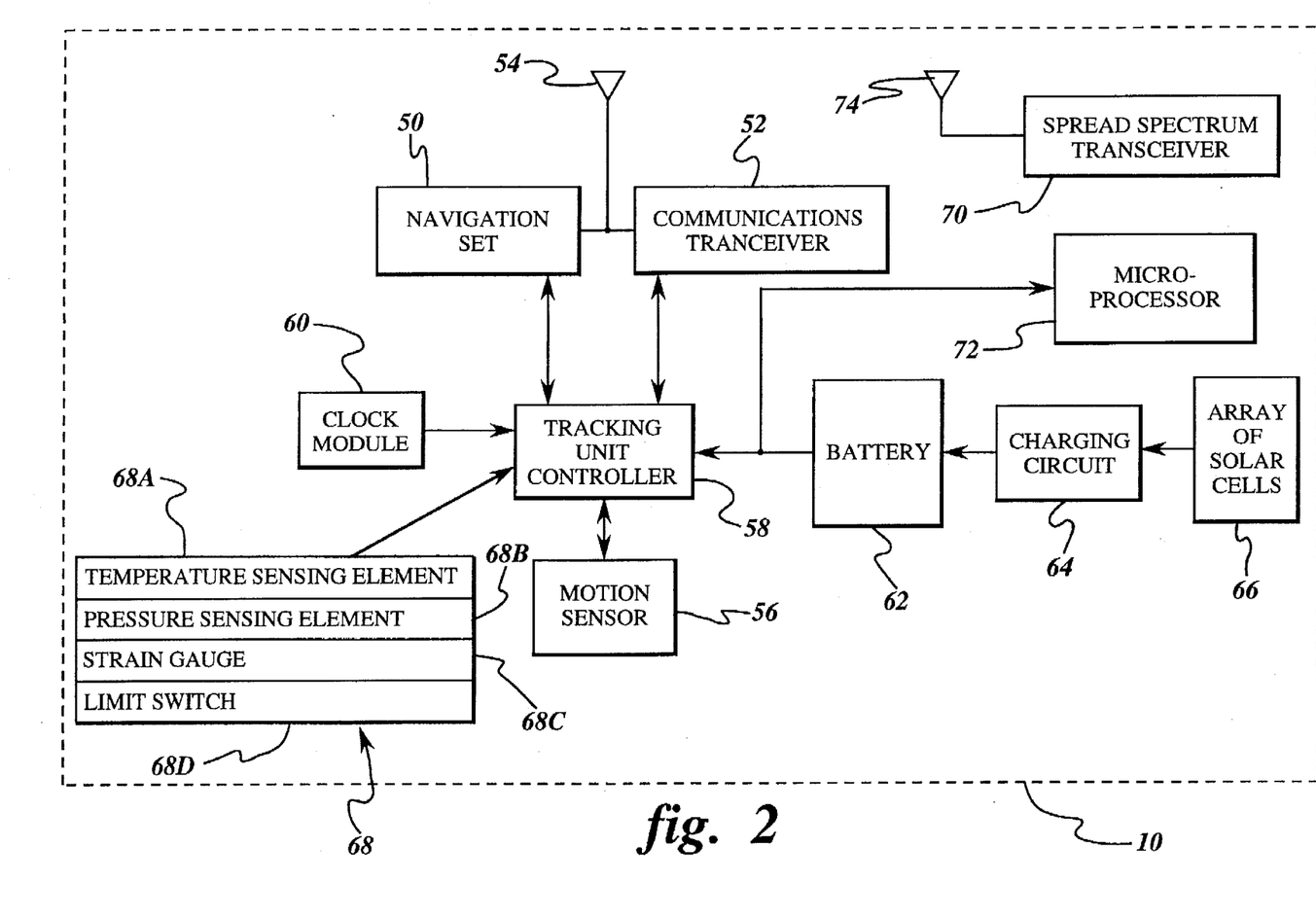
FIG. 2 is a block diagram showing in further detail a tracking unit as used in the tracking system shown in FIG. 1.

FIG. 2 is a block diagram of a mobile tracking unit 10 which includes a navigation set 50 capable of generating data substantially corresponding to the vehicle position. Choice of navigation set depends on the particular navigation system used for supplying navigation signals to any given mobile tracking unit. Preferably, the navigation set is a GPS receiver such as a multichannel receiver; however, other receivers designed for acquiring signals from a corresponding navigation system may alternatively be employed. For example, depending on the vehicle location accuracy requirements, the navigation set may comprise a Loran-C receiver or other such less highly-accurate navigation receiver than a GPS receiver. Further, the navigation set may can conveniently comprise a transceiver that inherently provides two-way communication with the central station and avoids the need for separately operating an additional component to implement such two-way communication. Briefly, such transceiver would allow for implementation of satellite range measurement techniques whereby the vehicle location is determined at the central station simply through use of range measurements to the vehicle and the central station from two satellites whose position in space is known. The need for power by either such navigation set imposes a severe constraint for reliable and economical operation of the mobile tracking unit aboard vehicles which typically do not carry power sources, e.g., shipping containers, railcars used for carrying freight, truck trailers, etc. Typical GPS receivers currently available generally require as much as two watts of electrical power for operation. For the GPS receiver to provide a location fix, it must be energized for some minimum period of time in order to acquire sufficient signal information from a given set of GPS satellites so as to generate a navigation solution. A key advantage of the present invention is the ability to substantially reduce the energy consumed by the mobile tracking unit by selectively reducing the activation or usage rate for the navigation set and other components of the mobile tracking unit. In particular, if, while the vehicle is stationary, the activation rate for the navigation set is reduced, then the energy consumed by the mobile tracking unit can be substantially reduced, for example, by a factor of at least one hundred.

Mobile tracking unit 10 includes a communications transceiver 52 functionally independent from navigation set 50. If the navigation set comprises a transceiver, the function of transceiver 52 can be performed by the transceiver of navigation set 50. Both transceiver 52 and navigation set 50 are actuated by a controller 58 which, in turn, is responsive to signals from a clock module 60. Transceiver 52 is capable of transmitting the vehicle location data by way of communication link 14 (FIG. 1) to the central station and receiving commands from the central station by way of the same link. If a GPS receiver is used, the Transceiver and the GPS receiver can be conveniently integrated as a single unit for maximizing efficiency of installation and operation. An example of one such integrated unit is the Galaxy InmarsatC/GPS integrated unit which is available from Trimble Navigation, Sunnyvale, Calif., and is conveniently designed for data communication and position reporting between the central station and the mobile tracking unit. A single, low profile antenna 54 can be used for both GPS signal acquisition and satellite communication.

A low power, short distance radio link permits joining the nearby tracking units in a network to minimize power consumption and maintain high reliability and functionality such network. As shown in FIG. 2, in addition to a power source 62 (which may comprise a battery pack that can be charged by an array of solar cells 66 through a charging circuit 64), a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
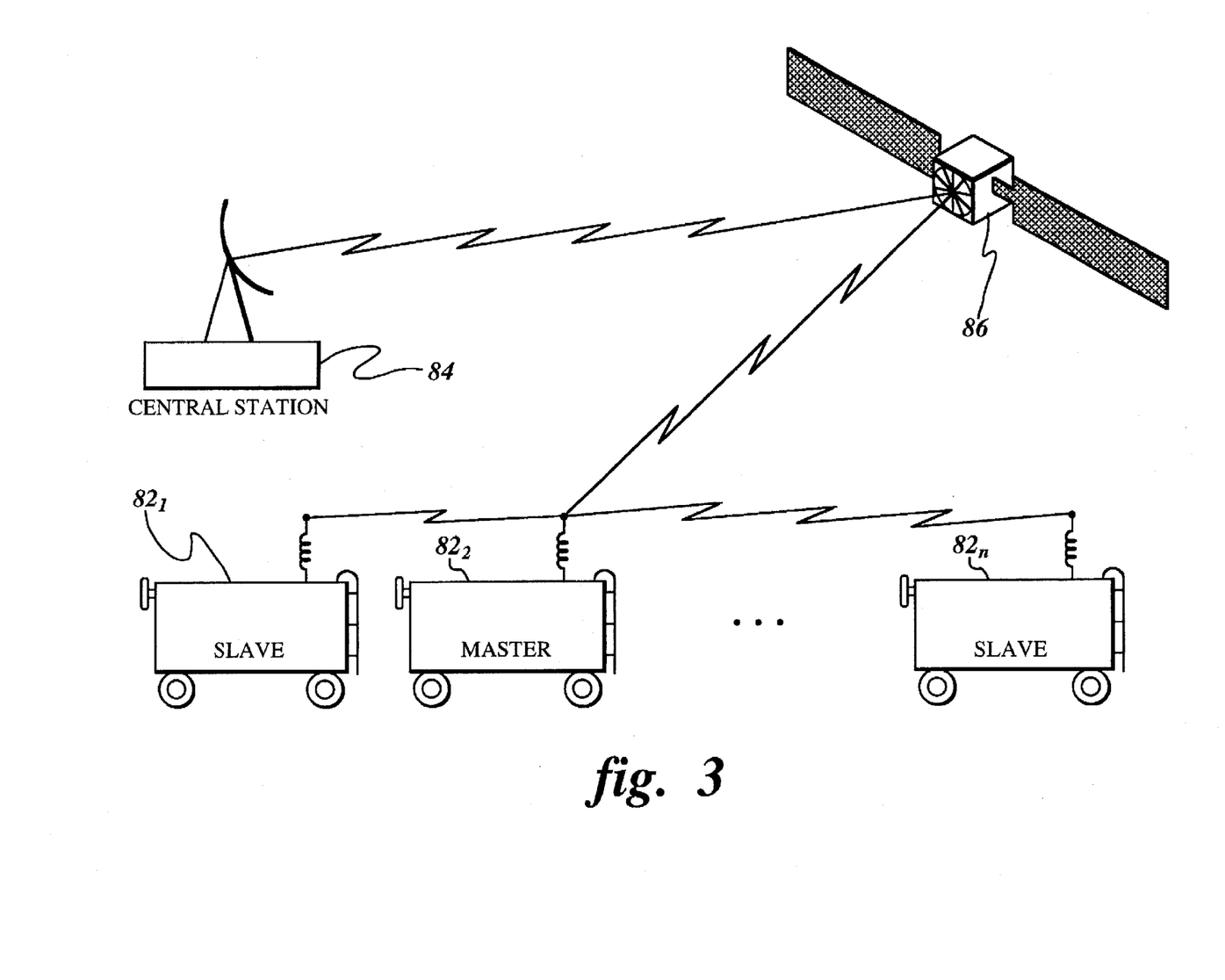
FIG. 3 is a block diagram illustrating organization of the mobile local area network implemented by the present invention.

Utilizing local transceiver 70, microprocessor 72 communicates with all other tracking units within communications range, forming a dynamically configured LAN, hereinafter denominated a "mutter network". Such mutter network is generally shown in FIG. 3. When a train includes multiple freight cars $82_1$, $82_2$, ..., $82_n$ equipped with tracking units of the type shown in FIG. 3, all of these units will exchange information. Because each microprocessor is interfaced to its own power source, respectively, the status of available power for each tracking unit can also be exchanged. Once this information is available, then the tracking unit with the most available power (i.e., most fully charged batteries) will become the designated master, the other tracking units being slaves. The master unit performs the GPS position and velocity reception function, assembles these data along with the IDs of all other tracking units on the train, and transmits this information periodically in a single packet to a central station 84 via communication satellite 86.

Because one GPS receiver among all of the tracking units is turned on at a time (as well as only one communications transceiver), total system power is reduced. Moreover, this function also increases reliability for each tracking unit because it automatically reduces the power consumed by a unit which has a degraded or partially functional power source. Thus, while a unit with weak batteries cannot perform the GPS receiving or information transmitting and command receiving functions, which are the most power consuming functions in the tracking unit, a tracking unit with damaged solar cells or a battery which can not hold a full charge can still be fully functional when it is part of a train with fully functional tracking units.

In each tracking unit the GPS receiver (or navigation set) and the satellite transceiver and their antennae are major, complex modules, so that a failure of any of these modules would render its tracking unit inoperative if no alternative communication system existed. Using low power spread spectrum transceiver 70 shown in FIG. 2 allows a tracking unit with this malfunctioning module to operate when it is part of a train with fully operational tracking units, thereby increasing the tracking system reliability and the reliability of the tracking unit. Another reliability feature is that the malfunctioning tracking unit can report its faulty status along with its location so that repairs can be scheduled.

An additional reliability feature allows location of a malfunctioning tracking unit that is not part of a train carrying a properly functioning tracking unit. A solitary railcar with a malfunctioning tracking unit (or a malfunctioning tracking unit which is the only tracking unit on a train) will monitor or "listen" on the low power transceiver at a low duty cycle (to conserve power). If the malfunctioning tracking unit comes within communication range of a properly functioning tracking unit (which continuously broadcasts ID requests to other tracking units), the malfunctioning unit will send out its own ID and status. This information will be passed on to the central station where data are collected. In this fashion, a solitary tracking unit with a malfunction in the power source, GPS receiver, satellite transmitter or antenna will still be reported each time it comes within range of a functional tracking unit.

The ability to exchange the roles of master and slave among the tracking units provides transmission diversity which enhances link quality and received data integrity. This occurs because one of the two units (i.e., the one with the most charged batteries) could experience severe attenuation of its transmitted signal due to shadowing loss resulting from an obstruction in the line of sight to the satellite. Selecting between the two units can mitigate this effect. Inclusion of more units in the selection procedure improves link quality at the cost of averaging power over a large number of tracking units. Currently, the GPS function consumes the most power and, in this case, the transmission selection is restricted to two tracking units.

If the satellite has dual channels (i.e., two frequencies or two time slots) for transmitting information on the reverse up-link (railcar to satellite) and on the forward down-link (satellite to ground station), then the two tracking units with the most charged batteries can be used to provide receive diversity. In this scheme, the ground station will poll the two transmissions and detect them either by combining the signals or by selecting between the two signals. This form of diversity reception reduces the link power budget, implying that both transmissions can be of lower power.

If there is a two-way link between the ground station and railcar tracking units, then it is possible to use the return link to control which of the two tracking units to use for transmission. This is useful when the unit with the stronger battery is more heavily shadowed, and can help to conserve the battery power.

To make use of the mutter mode, a protocol is provided which allows certain operations to occur. These operations include the following:

1. Forming a network from two or more independent tracking units and determining which unit is master of the network.
2. Maintaining a network with regular communication between master unit and all slave units.

3. Removing one or more units from a network when they are moved out of communication range from the master unit.

4. Adding one or more units to a network when they are brought into communication range with the master unit.

5. Merging two or more networks when the network master units come within communication range of each other.

6. Transferring the role of master unit from a master unit with weak battery power to a slave unit with a stronger battery.

The above operations must be performed in a manner that conserves battery power, which implies providing a minimal amount of transmitted data from any tracking unit and minimizing the time during which the unit's receiver must be on. These objectives must be met within realistic economic and technological constraints such as limited individual clock accuracy and a communication channel which has a finite error rate.

Figure 4:
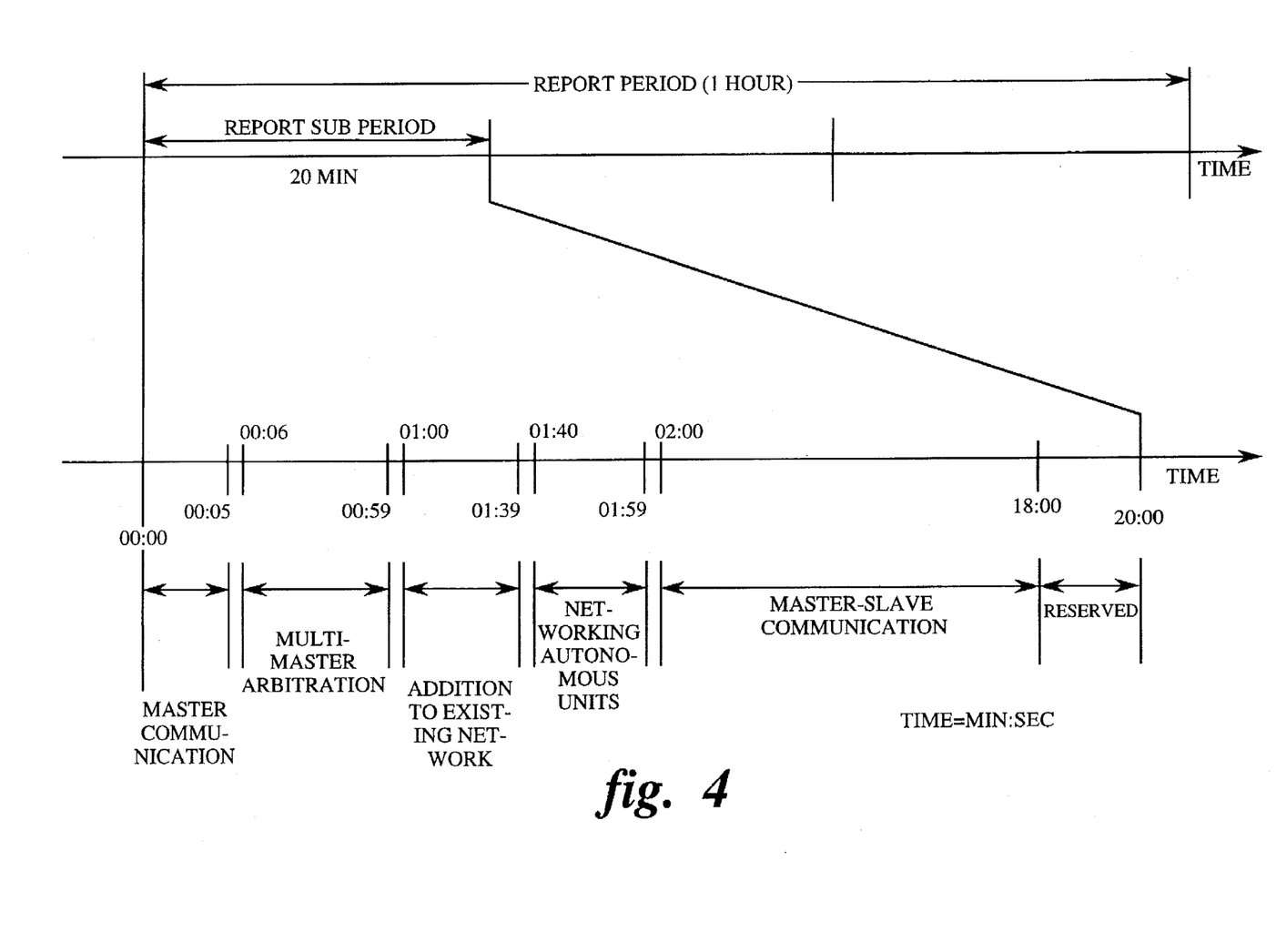
FIG. 4 is a timing diagram showing organization of time used for mutter-mode communications.

Certain characteristics and parameters must be defined for a description of the "mutter mode", or mode by which a subset of tracking units communicate with each other in a mobile, dynamically-configured LAN. As shown in the timing diagram of FIG. 4, all slave units in a network communicate with the master unit of that network during a report period. Shorter report periods provide better time resolution of asset movements, while longer report periods use less power. The report period is divided into several sub-periods. Shorter sub-periods allow more message retransmissions for more reliability, while longer sub-periods promote fewer message collisions and accommodate more assets per network. As indicated in FIG. 2, each asset tracking unit includes a moderately accurate local clock 60. This clock has a short term relative clock accuracy measured over one report period and a long term absolute clock accuracy measured over several days. The long term clock accuracy is corrected during any communications with the GPS satellite communication system, or any other tracking or communication system with which the tracking unit is in periodic contact. Greater accuracy reduces system power consumption, while lesser accuracy lowers system hardware costs.

Messages sent between tracking units in the mutter mode have a transmission time which includes any preamble and synchronization bits, the data bits and error checking bits. A poll-acknowledge bit pair occupies a time slot, including all guard bands and turnaround times. Shorter transmission times reduce power consumption, while longer transmission times increase message transmission success rate. Tracking units can transmit and/or receive on two different channels. These channels may be different frequencies, or they may be different sequences in a PN sequence spread spectrum code. The channels will be identified as channel 1 and channel 2. In this protocol, it is also possible to use the same channel for all communications, but interfaces to protocols in other applications may make use of these two channels.

The communications actions of a tracking unit depend on what state or mode it is in. A tracking unit can be in one of the following modes:

1. Autonomous Mode—In this mode, a tracking unit communicates with the central station directly. It is not networked to a mutter mode network.

2. Orphan Mode—In this mode, the tracking unit (i.e., "orphan" tracking unit) is unable to communicate with the central station and is not included in a mutter network. The central station does not have information about the current location of the orphan tracking unit. The orphan unit may or may not have data identifying its current location.

3. Master Mode—The master tracking unit communicates with the central station directly. It is also networked to other tracking units in the mutter network and transmits information about the networked tracking units to the central station.

4. Slave Mode—Each slave tracking unit does not communicate with the central station directly, but is included in a mutter network and sends its sensor data and, optionally, its location data, to a master tracking unit. The master tracking unit in turn transmits the data from the slave tracking unit to the central station.

When a mutter network has been formed, the following protocol is used when no tracking units are joining or leaving the network. The times given are by way of example only. Time is given as minutes:seconds for a one hour report period, and the master tracking unit and slave tracking unit are respectively referred to as "master" and "slave".

00:00–00:05—The network master is tuned to receive on channel 1 during this interval except for the short (50 msec) transmission time during which the master transmits a "CALL FOR NEW MEMBERS" on channel 1.

The transmission time is randomly placed within the center second of the five second period. A different random position is chosen for each sub-period. During steady state (no slaves or masters join the network), no data will be received.

01:00–01:39—This period is reserved for adding new tracking units to an existing network. It is not used in steady state operations.

01:40–01:59—This period is reserved for forming new networks among two or more autonomous tracking units. It is not used in steady state operations.

02:00–18:00—This period is divided into 16×60/0.1= 9600 time slots (each slot is 100 msec long) for poll-acknowledge pairs.

Each slave tracking unit has a time slot assigned by the master tracking unit. The master unit randomly distributes the assigned time slots among the 9600 available slots, and each slave unit keeps the same time slot from one report period to the next unless specifically reassigned by the master. When the master clock arrives at a time slot occupied by a slave, the master unit turns on its transmitter and sends an "ARE YOU STILL PRESENT?" message, which takes the first 50 msec of the time slot. The master unit then turns off its transmitter, turns on its receiver, and monitors its channel frequency for the reply "I AM STILL PRESENT". After 50 msec, i.e., at the end of the time slot, the master receiver is turned off whether a correct reply is received or not. The master tracking unit stays in a low power or "sleep" mode until the next occupied time slot when this procedure is repeated.

Each slave unit stays in a low power or "sleep" mode until a time that is twice the short term clock accuracy before the beginning of the time slot assigned to it (as measured by the slave unit's own clock). At this time, the slave unit turns on its receiver and waits until a time that is twice the short term clock accuracy after the end of the time slot assigned to it, at which time the radio transceiver is turned off. The slave unit awaits the "ARE YOU STILL PRESENT?" message which contains the slave unit's ID code. If the slave unit receives this message, it immediately turns off its receiver, turns on its transmitter and sends the "I AM STILL PRESENT" reply, and returns to the low power mode. If the slave unit receives a correct interrogation message from the master unit, then the slave unit uses the time of the start of the received message to resynchronize its clock based on the master clock for the next scheduled "ARE YOU STILL PRESENT?" message. This procedure ensures that even if the local clocks of the master and slave units at slightly different rates, the slave will always have its receiver turned on when the master transmits an interrogation to it. This further ensures that the slave unit will be turned off for as much of the time as is possible, thereby conserving power.

18:01–19:59—Reserved for future use.

20:00–20:05—Repeat of 00:00–00:05

20:06–21:59—Repeat of 00:06–01:59

22:00–38:00—During the 02:00–18:00 period, the master queries all slaves for their presence.

If any of these queries does not receive a successful reply, the master unit retransmits the "ARE YOU STILL PRESENT?" message for that particular slave unit in the same time slot (of the 9600 time slots available) and awaits a reply. If the slave unit had not received its interrogation during the 02:00–18:00 period, then the slave waits for the same period of time (i.e., two short term clock accuracy periods on either side of the assigned time slot) as in the 02:00–18:00 period. If the query is received, the slave unit transmits a reply.

38:01–39:59—Reserved for future use

40:00–40:05—Repeat of 00:00–00:05

40:06–41:59—Repeat of 00:06–01:59

42:00–58:00—If the master unit made any queries during the 02:00–18:00 period and the 22:00–38:00 period with a slave unit responding in neither, then the master unit queries in the same time slot one more time.

If the slave unit does not receive its interrogation during the 02:00–18:00 period or the 22:00–38:00 period, then the slave waits once again during its assigned time slot. If the query is received, the slave unit transmits a reply.

58:01–59:59—This period is reserved for communication between multiple masters. It is not used in steady-state operations.

This completes one report period. This same sequence is repeated every hour and is synchronized to universal time (UTC) as received from GPS, satellite communication or other location or communication system.

The general format followed by all message packets is given below:

where SYNCH is the synchronization preamble to establish carrier synchronization and symbol boundaries, DEST ADDR is the destination address of the tracking unit to which the packet is destined and may be a broadcast address in case the packet is addressed to all tracking units, SOURCE ADDR is the address of the source unit, C is a control field designating the message type, DATA is the main information in the message, and FEC is a forward error correction for errors formed over DEST ADDR field through DATA field. The number above each segment of the packet (except DATA) indicates the number of bits that make up the respective segment.

The different types of messages used in the mutter mode are the following:

"ARE YOU STILL PRESENT?" message (88 bits):
    SYNCH: 8 bits preamble/synchronization
    DEST ADDR: 24 bits slave ID
    SOURCE ADDR: 24 bit master ID
    C: "01" - normal presence query
    DATA: 8 bits clock information
    FEC: 16 bits error control
"I AM STILL PRESENT" message (92 bits):
    SYNCH: 8 bits preamble/synchronization
    DEST ADDR: 24 bits slave ID
    SOURCE ADDR: 24 bit master ID
    C: "02" - normal presence reply
    DATA: 12 bits sensor data or exceptions
    FEC: 16 bits error control
"CALL FOR NEW MEMBERS" message (88 bits):
    SYNCH: 8 bits preamble/synchronization
    DEST ADDR: 24 bit broadcast address
    SOURCE ADDR: 24 bits network master ID
    C: "03" - call for new members
    DATA: 8 bits clock information
    FEC: 16 bits error control
"SEARCHING FOR A NETWORK" message (92 bits):
    SYNCH: 8 bits preamble/synchronization
    DEST ADDR: 24 bit broadcast address
    SOURCE ADDR: 24 bits autonomous unit ID
    C: "03" - search for a network
        DATA: 4 bits battery level, 4 bits direction
        of travel, 4 bits additional info (status of satellite
        communication, emergency data present, etc.)
    FEC: 16 bits error control
"MERGE TWO MASTERS" message (variable bits):
    SYNCH: 8 bits preamble/synchronization
    DEST ADDR: 24 bits receiving master ID
    SOURCE ADDR: 24 bit transmitting master ID
    C: "04" - merge two masters
        DATA: 16 bits clock correction data, 8 bits
        velocity of transmitting master, 8 bits direction of
        travel of transmitting master, 16 bits number of
        slaves in network of transmitting master, 24 bits ID +
        8 bits time slot of slave #1, 24 bits ID + 8 bits
        time slot of slave #2, . . ., 24 bits ID + 8 bits time
        slot of slave #N
    FEC: 16 bits error control
"MERGER SUMMARY" message (144 bits):
    SYNCH: 8 bits preamble/synchronization
    DEST ADDR: 24 bits receiving master ID
    SOURCE ADDR: 24 bit transmitting master ID
    C: "05" - merge two masters
        DATA: 16 bits clock correction data, 8 bits
        velocity of transmitting master, 8 bits direction of
        travel of transmitting master, 16 bits number of
        slaves replying in network of transmitting master,
        16 bits number of slaves replying in network of
        receiving master
    FEC: 16 bits error control
"AUTONOMOUS, JOIN THE NETWORK" message (112 bits):
    SYNCH: 8 bits preamble/synchronization
    DEST ADDR: 24 bits autonomous unit ID
    SOURCE ADDR: 24 bit master ID
    C: "06" - join the network
        DATA: 16 bits clock correction data, 16 bits
        time slot assignment, 8 bits velocity of master, 8
        bits direction of travel of master
    FEC: 16 bits error control
"I AM JOINING THE NETWORK" message (88 bits):
    SYNCH: 8 bits preamble/synchronization
    DEST ADDR: 24 bits master ID
    SOURCE ADDR: 24 bits autonomous unit ID
    C: "07" - joining the network
    DATA: 8 bits status and sensor data
    FEC: 16 bits error control
"SLAVE, BECOME MASTER" message (variable bits):
    SYNCH: 8 bits preamble/synchronization
    DEST ADDR: 24 bits slave ID
    SOURCE ADDR: 24 bit master ID
    C: "08" - transfer role of network master to a slave
        DATA: 16 bits clock correction data, 8 bits
        time slot to query current master, 8 bits direction of
        travel of transmitting master, 16 bits number of
        slaves in network, 24 bits ID + 8 bits time slot of -continued slave #1, 24 bits ID + 8 bits time slot of slave
2, . . ., 24 bits ID + 8 bits time slot of slave #N
FEC: 16 bits error control Trains carrying many freight cars with tracking units can be quite lengthy, up to two kilometers (km) from front to back. Varying environmental conditions such as weather, radio reflecting objects close to the track, and track curvature combined with distance makes it probable that some messages between master and slave tracking units will not be received. The protocol described above assures that multiple attempts are made in every report period to successfully communicate between master and slave tracking units. Additionally these attempts are made at widely separated times so that communication obstacles that are time or position dependent on a moving train will vary to allow one of the multiple attempts to succeed.

When consists of multiple cars carrying tracking units are delivered to a destination, cars (and tracking units) are removed from the train and the train leaves the vicinity. When this occurs, the master unit must have a way of removing the slave units from the network, and the slaves units must have a way of recognizing that they are now autonomous. The procedure for removing one or more tracking units from the network is described below.

As the master unit and any remaining slave units are separated from one or more slave units by sufficient distance (for example, five km), radio communication between them is no longer possible. During all of the sub-periods (three in the example given) of one report period, the slave unit will not receive any "ARE YOU STILL PRESENT?" messages. When two full report periods have elapsed with no such receptions, the slave unit changes its own status to that of an autonomous unit.

The process for having a master unit remove a slave unit from its network is similar. Once the master has gone for two full report periods without receiving a reply from a slave, that slave is removed from the network, and the master will no longer query it. If the master loses all slaves in the network, it reverts to autonomous status.

When two mutter networks come within range of each other, they must either merge into one network or remain separate. The following protocol defines the operations for one report period. The times given are an example using the parameter values chosen above, but this protocol works for other choices of parameters. Time is given in minutes:seconds for the one hour report period.

00:00–00:05—The network master listens on channel 1 during all of this time except for the short transmission time during which the master transmits a "CALL FOR NEW MEMBERS" on channel 1.

The transmission time is randomly placed within the center second of the five second period. During this time period, a second network master unit is now within communication range of the first network master unit, and is following a similar protocol. Because the network master units have not communicated with each other previous to this time, the clocks of the master units are not synchronized. The length of time spent listening (receiving) relative to the long term clock accuracy specification is such that the masters are guaranteed to overlap. At the end of 00:05, the masters have received each other's signals, but neither has directed a reply to the other.

00:06–00:59—Whichever master unit first transmitted its "CALL FOR NEW MEMBERS" sends out a "MERGE TWO MASTERS" message at 00:06.

The other master unit records this information and determines if its is desirable to merge. If the speed and/or heading information (i.e., velocity profile) of the two master units are different, then these two masters should not be merged, and no reply is given by the second master.

If the velocity profiles are identical, the second master replies to the "MERGE TWO MASTERS" message with its own "MERGE TWO MASTERS" message. Each master now has the network information of both networks. Each master now looks for conflicts where the "ARE YOU SILL PRESENT?"—"I AM STILL PRESENT" query/reply time slots of the different networks interfere. Interference may mean occupying the same time slot in the two networks, or it may also include occupying a nearby slot. Where interference is found, the two masters each move the interfering time slots away from each other by a small amount (e.g., two time slots) to assure that they do not interfere. If the identical time slots are occupied, then the direction of displacement is such that the master which first transmitted the "CALL FOR NEW MEMBERS" moves its network members earlier and the other network's members later. The new transmission times, however, will still occur during the time that the proper slave receivers are turned on.

01:00–58:00—Normal operation, polling done with one master sending, both masters receiving the "ARE YOU STILL PRESENT?"/"I AM STILL PRESENT" query/reply.

The times that the "ARE YOU STILL PRESENT?" queries are sent out may be shifted slightly, but they still overlap the times in which the slave receiver is operational. Slaves receiving the time-shifted query reply immediately and reset their internal time slot for the perceived change in slot position.

58:01–59:59—Whichever master first transmitted its "CALL FOR NEW MEMBERS" message sends out a "MERGER SUMMARY" message at 58:03.

The 16 bits representing the number of slaves replying in the network of the transmitting master specify the number of receivable marked slaves that belong to the original network of the transmitting master. Similarly, the 16 bits representing the number of slaves replying in the network of the receiving master specify the number of receivable marked slaves that belong to the original network of the other, receiving master. Each master now holds information as to how many slaves from both networks the other master will become a slave in the new network. In case both masters receive responses from the same number of slaves, then whichever master first transmitted its "CALL FOR NEW MEMBERS" becomes the master for the new network. The new network master now issues an "AUTONOMOUS, JOIN THE NETWORK" message, to which the old master replies with an "I AM JOINING THE NETWORK" message. The old master is now a slave in the new network.

Assume that a mutter network has been formed. During the course of polling its slaves, the battery power of the network master might become sufficiently low that the network master is prompted to pass the responsibility of the master on to one of the slaves whose battery power is still strong. When an extant network master is ready to transfer its role to another slave, it begins the process of transferring the role in the next reporting period. The network master selects the slave having the highest battery power. The following protocol is used to transfer the role of master from the network master to one of the slaves. The activity represented is one report period. Again, the times given are an example using the parameter values chosen above, but this protocol works for other choices of parameters. Time is given in minutes:seconds for the one hour report period.

00:00–02:00—The network master performs its role as usual. If, during this time, the network master receives a transmission from another master, it will not attempt to merge with the other master.

02:00–18:00—The network master polls all the slaves in the normal fashion with the "ARE YOU STILL PRESENT?"/"I AM STILL PRESENT" query/reply sequence except for the slave to which it will pass on the role of the master.

In the scheduled time slot of this slave, the network master transmits the "SLAVE, BECOME MASTER" message which includes ID and time slot information for polling all the slaves in the mutter network. In the message, it also includes its own ID and time slot at which the slave should poll the master. The slave responds by transmitting an "I AM STILL PRESENT" message. This acknowledges that the slave has taken over the role of the new master and will function as a new master in the next report period. In the present report period, the extant master operates as usual. The operation of sending and receiving a "SLAVE, BECOME MASTER"/"I AM STILL PRESENT" query/reply sequence is the same as the "ARE YOU STILL PRESENT"/"I AM STILL PRESENT" query/reply sequence.

If, however, the intended slave has not received the "SLAVE, BECOME MASTER" message, the slave does not transmit the "I AM STILL PRESENT" message. In this case, the master again attempts to transmit the "SLAVE, BECOME MASTER" message in the requisite time slot in the next report sub-period (22:00–38:00). If during this time the master is still unable to reach the slave, it will attempt to reach the slave in the subsequent report sub-period.

If during the entire report period a master is unable to transfer the role of the master to a slave, it will select a new slave to which it will attempt to pass on the role of the master in the next report period. The network master will go through this process until it finds a slave which is ready to take up the role of the master.

Again assume that a mutter network has been formed. The following protocol is used when one tracking unit is joining the network. The times given are an example using the parameter values chosen above, but this protocol works for other choices of parameters. Time is given in minutes:seconds for the one hour report period.

00:00–00:05—The network master receives on channel 1 during all of this time except for the short (50 msec) transmission time during which the master transmits a "CALL FOR NEW MEMBERS" message on channel 1.

The transmission time is randomly placed within the center second of the five second period. A different random position is chosen for each sub-period.

During this time period, an autonomous tracker that is now within communications range of the network master follows a similar protocol. The autonomous unit sends a 50 msec transmission "SEARCHING FOR A NETWORK" message randomly within the center second of the five seconds in which it is listening for available masters. Because the autonomous unit has not had any communication with the master previous to this time, the clocks of the master and the autonomous unit are not synchronized. The length of the time spent receiving relative to the long term clock accuracy specification is such that the master and the autonomous units are guaranteed to overlap. At the end of 00:05, the master has received a transmission from the autonomous unit and the autonomous unit has received a transmission from the master, but neither has directed a reply to the other.

00:06–00:59—Used for multiple masters

01:00–01:39—At a fixed time (say, 60 seconds) after the autonomous unit has sent its "SEARCHING FOR A NETWORK" message, the autonomous unit turns on its receiver.

At 60 seconds after the master receives the "SEARCHING FOR A NETWORK" message, the master sends out an "AUTONOMOUS, JOIN THE NETWORK" message. This message contains time slot and clock correction information. The autonomous unit replies with a "I AM JOINING THE NETWORK" message. At this time, the autonomous unit becomes a slave, and it starts replying to "ARE YOU STILL PRESENT" messages in the assigned time slot of the 02:00–18:00 time interval immediately following.

If the master does not receive the "I AM JOINING THE NETWORK" reply message from the autonomous unit immediately, the master will retransmit the "AUTONOMOUS, JOIN THE NETWORK" message for up to three times. If no response is received, then the autonomous unit is assumed not to be a member of the network. Similarly, the autonomous unit awaits receipt of the "AUTONOMOUS, JOIN THE NETWORK" message addressed to itself and reply. If the autonomous unit does not receive the "AUTONOMOUS, JOIN THE NETWORK" message addressed to it, then it continues to await its receipt for some period of time (say, five seconds) after the last message received from the master. If the autonomous unit does receive and reply to the "AUTONOMOUS, JOIN THE NETWORK" message, it waits for another five seconds to receive the message if it is sent again (in case the master did not receive the reply) and reply again if the message is received.

If transmissions from more than one autonomous unit are received by the master, then the master performs the above request/reply procedure with each autonomous unit from which it received transmissions during the 00:00–00:05 period of time. The autonomous units are addressed in the order in which the master has received their "SEARCHING FOR A NETWORK" message.

01:40–59:59—Normal network polling operations

The following protocol is used when combining two or more autonomous trackers to form a network.

00:00–00:05—During this time period, multiple autonomous trackers that are now within communications range of each other send a 50 msec transmission message, "SEARCHING FOR A NETWORK", randomly within the center of the five second period.

Because the autonomous units have not had any communication with each other previous to this time, the clocks of the units are not synchronized. Relative to the long term clock accuracy specification, the length of time spent receiving is such that all of the autonomous units transmissions and receptions will overlap. At the end of 00:05, the autonomous units have received each other's "SEARCHING FOR A NETWORK" message, but no replies have been sent. Each autonomous unit has recorded the IDs of all of the other autonomous units which it has received. The autonomous units individually sort all of the IDs received and their own ID into ascending order. Because all IDs are unique, there are no duplications.

If any autonomous unit has received a master unit's "CALL FOR NEW MEMBERS" message, then that autonomous unit will attempt to join the master. It will not attempt to combine with other autonomous units.

00:06–01:39—Used for units to join masters (see above)

00:1:40–01:59—Each unit examines its sorted list of IDs. The unit which has its own ID as the smallest value of the list now acts as a master which has received several "SEARCHING FOR A NETWORK" messages.

Alternatively, any algorithm which determines a unique master based on address, battery level and other parameters can be used. This self appointed master then chooses a random time within 01:40–01:44 to start sending out a series of "AUTONOMOUS, JOIN THE NETWORK" messages addressed to all the other autonomous units on the list. This message contains time slot and clock correction information for the new network.

The autonomous units turn on their receivers at 01:40 and monitor transmissions. When an autonomous unit receives an "AUTONOMOUS, JOIN THE NETWORK" message which has its own ID as the autonomous ID and also has the lowest number on its own internal list as the master ID, then it replies with an "I AM JOINING THE NETWORK" message. After all "AUTONOMOUS, JOIN THE NETWORK"/"I AM JOINING THE NETWORK" messages have been exchanged, this new network stands fully formed by the self-appointed master and all of the autonomous units which have successfully joined. Any autonomous units which have not successfully joined remain autonomous for the rest of this report period.

02:00–59:59—Normal network polling operations

Figure 5:
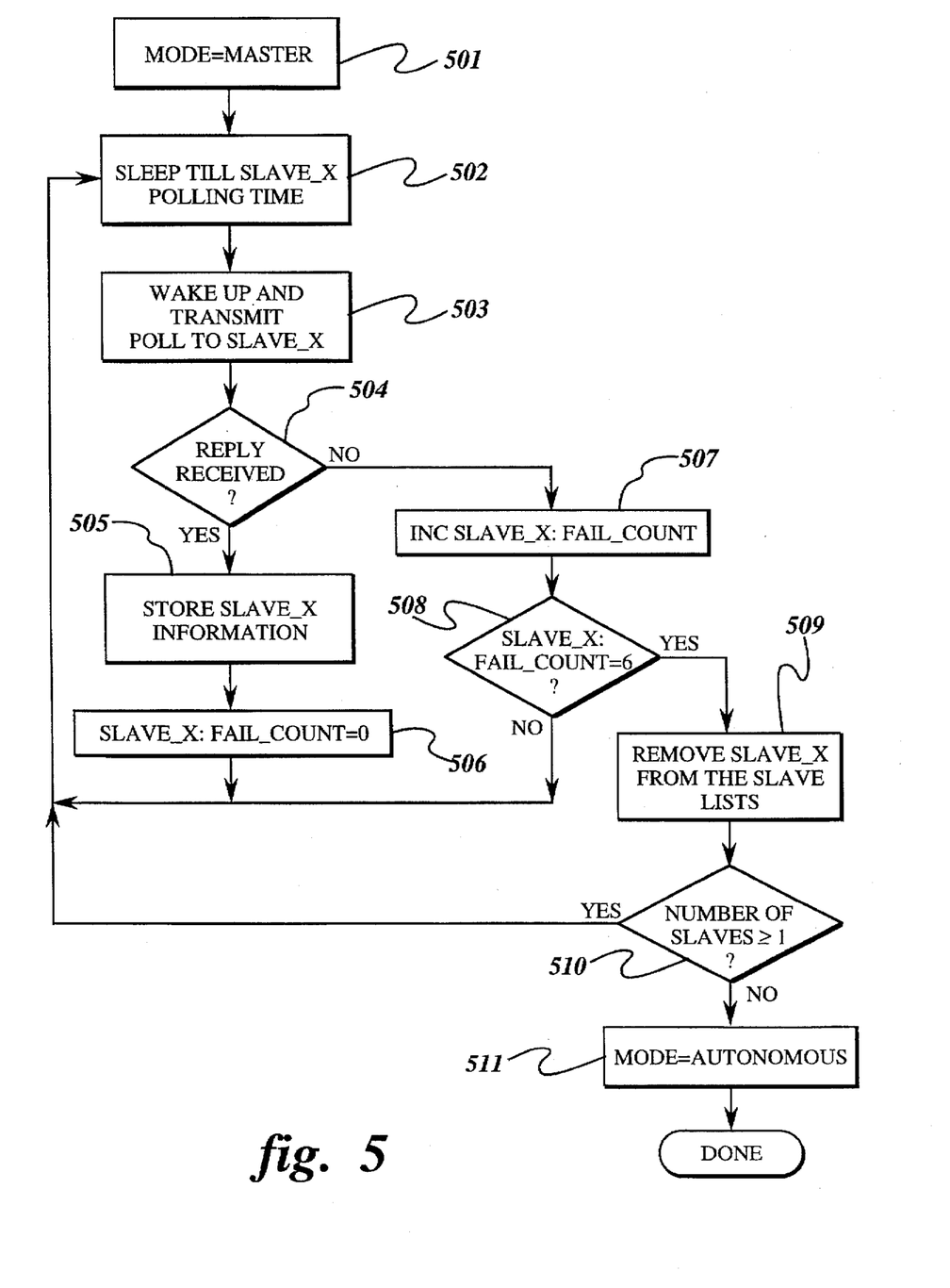
FIG. 5 is a flow diagram showing the process employed at a master unit for polling a slave unit.

The protocol described above is summarized and illustrated in the flow diagrams of FIGS. 5 to 8. FIG. 5 is a flow diagram illustrating the process at a master for polling one slave. For each slave, the master goes through a similar logic. The mode is set to master at step 501. The master unit "sleeps" until the slave unit polling time at step 502. At that time, the master unit "wakes up" and transmits a poll to the slave unit at step 503. A test is then made at decision block 504 to determine whether a reply was received from the slave. If so, the slave information received is saved at step 505, and the failure count for that slave is set to zero at step 506. The process loops back to step 502. If, however, a reply is not received, the failure count for that slave is incremented at step 507. A test is made at decision block 508 to determine if the failure count for that slave is equal to six. If not, the process loops back to step 502; otherwise, the slave is removed from the master's slave list at step block 509. Next, a test is made at decision step 510 to determine if the number of slaves on the master's slave list is equal to or greater than one. If so, the process loops back to step 502. If not, the mode for the unit is set to autonomous at step 511, and the process exits.

Figure 6:
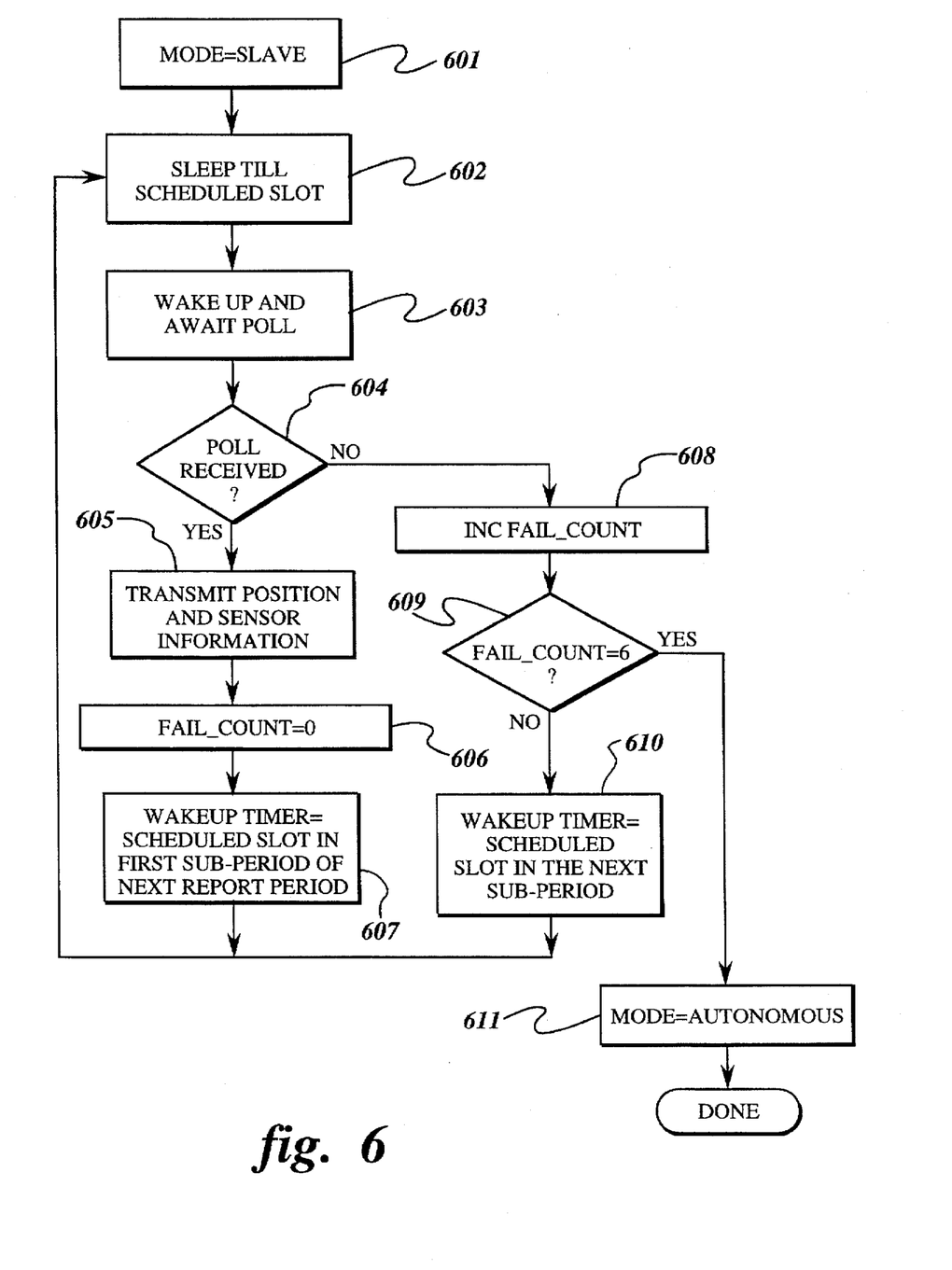
FIG. 6 is a flow diagram showing the process employed at a slave unit for transmitting information to the master unit and for changing state to autonomous.

FIG. 6 is a flow diagram illustrating the process at a slave for transmitting information to the master and for changing state to autonomous. The mode is initially set to slave at step 601. The slave unit "sleeps" until the slave unit's scheduled time slot at step 602. At that time, the slave unit "wakes up" and awaits receipt of a poll from the master unit at step 603. A test is then made at decision step 604 to determine whether a poll was received from the master. If so, the slave transmits position and sensor information to the master at step 605, and the failure count for that slave is set to zero at step 606. Then, at step 607, the wake-up timer is set for the scheduled time slot of the first sub-period of the next report period. The process loops back to step 602. If, however, a reply is not received, the failure count for that slave is incremented at step 608. A test is made at decision step 609 to determine if the failure count for that slave is equal to six. If not, the wake-up timer is set for the scheduled time slot of the first sub-period of the next report period at step 610, and the process loops back to step 602; otherwise, the state of the slave unit is changed to autonomous at step 611.

Figure 7:
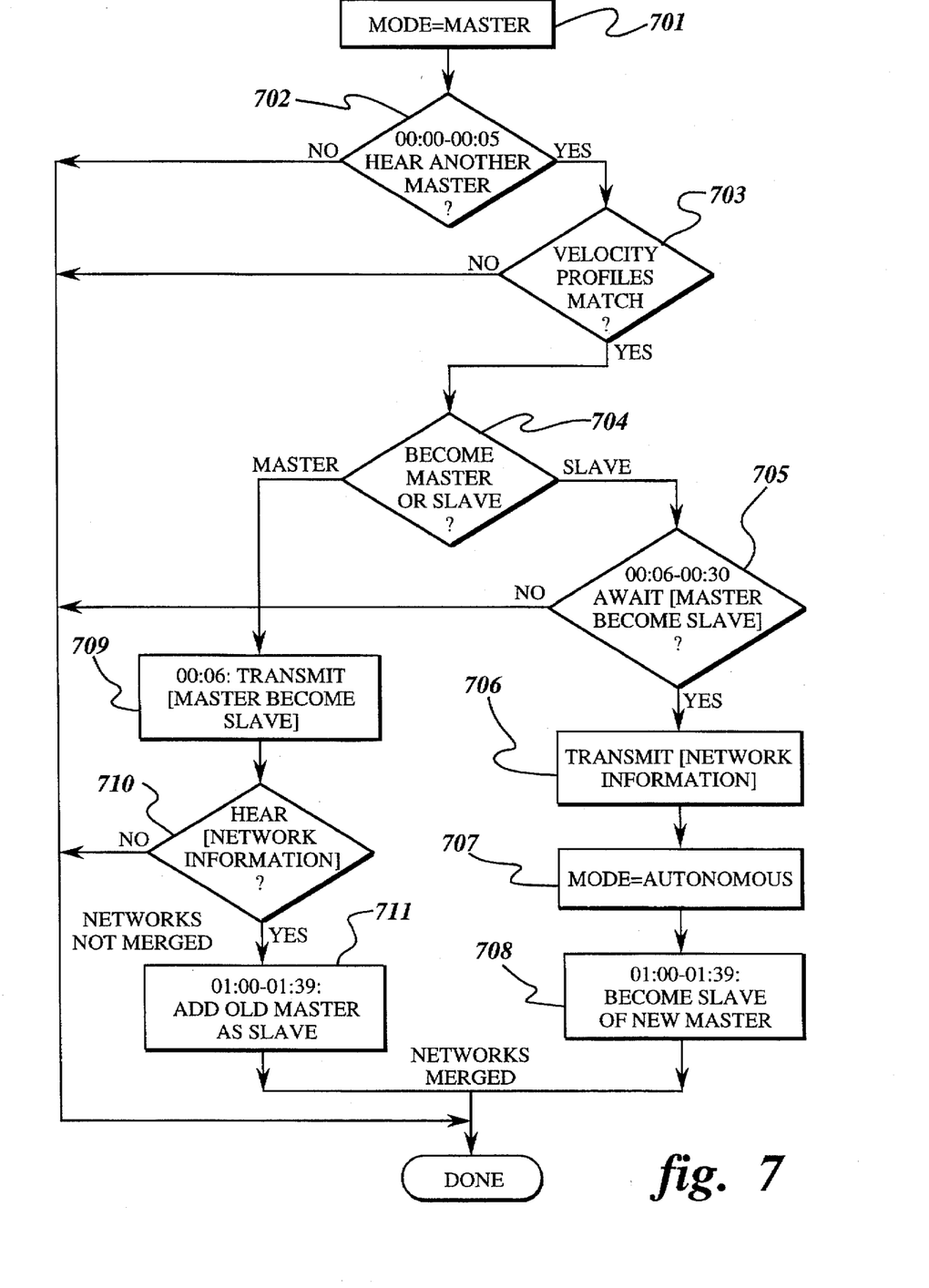
FIG. 7 is a flow diagram showing the process of merging two established local area networks.

FIG. 7 shows the flow diagram for the process at a master unit for merging two established networks. The mode is initially set to master at step 701. A test is made at decision step 702 during the time period 00:00–00:05 to determine if another master unit is transmitting. If not the process ends; otherwise, a further test is made at decision step 703 to determine if the velocity profile of the other master unit matches that of this master unit. If not, the process ends; otherwise, another test is made at decision step 704 to determine if this master unit is to become a slave unit. If this master is to become a slave unit, it awaits, at 00:06–00:30, receipt of the message "MASTER BECOME SLAVE" from the other master unit, as indicated at decision block 705. If that message is not received, the process ends; otherwise, upon receiving the message, this master unit transmits its network information to the other master unit at step 706 and then sets its mode to autonomous at step 707. In the time period 01:00–01:39, the master unit becomes a slave unit of the other master unit at step 708, completing the process of merging the networks.

On the other hand, if this master unit is to remain the master unit as determined at decision step 704, at time 00:06 it transmits the message "MASTER BECOME SLAVE" at step 709. Then the master unit waits for the other master unit to transmit its network information at decision step 710. If the master unit does not receive the network information from the other master unit, the process ends. However, when the network information is received, the other master unit is added to this master unit's slave list in the time period 01:00–01:39 at step 711, completing the process of merging the networks.

Figure 8:
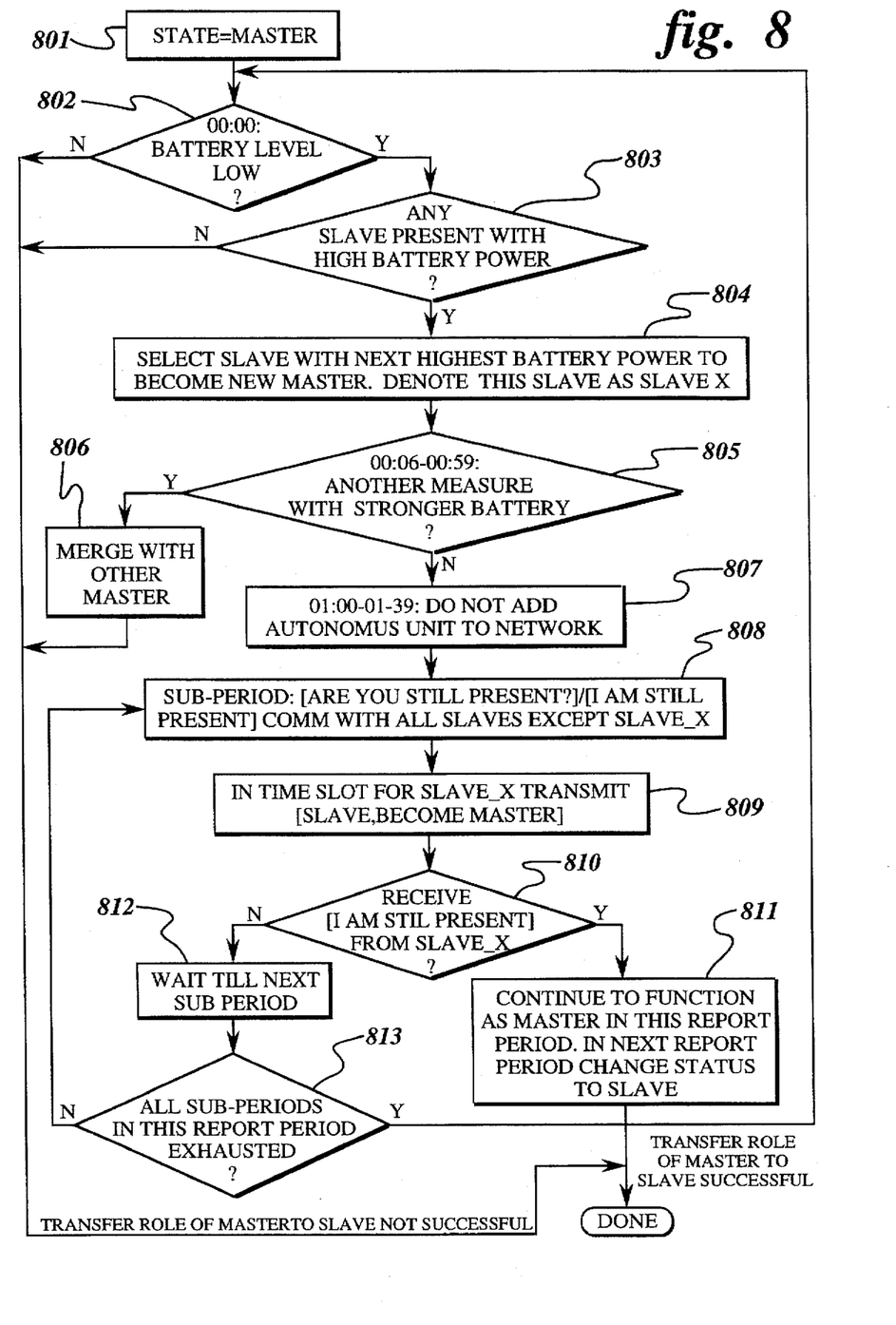
FIG. 8 is a flow diagram of the process employed at a master unit for transferring the role of master to slave.

FIG. 8 shows the flow diagram for the process at a master unit for transferring the role of master to a slave unit. The mode is initially set to master at step 801. A test is made at decision step 802 to determine if the battery is low. This is done at the beginning of the time period. If the battery is not low, the process ends. If, however, the battery is low, a further test is made at decision step 803 to determine if there is any slave unit present with a higher battery power. If not, the process ends; otherwise, the slave unit with the highest battery power is selected to become the new master unit at step 804. At time period 00:06–00:59 the master unit awaits transmission from another master unit which may have a stronger battery. If such a master exists, as determined at decision step 805, then the procedure described with respect to FIG. 7 is called for at step 806. Otherwise, at time period 01:00–01:39, the process of adding an autonomous unit to the network is inhibited at step 807. Then the polling query/response procedure is performed at step 808 except that the slave unit selected to become the new master unit is not polled with the "ARE YOU STILL PRESENT" message; instead, at step 809, the "SLAVE, BECOME MASTER" message is transmitted to that slave unit in its time slot. At decision step 810, the master unit waits for an "I AM STILL PRESENT" message from the slave unit selected to become the new master unit. If that message is received, the master unit continues to function as a master unit for the balance of the report period, but at the end of the report period, the master unit changes its status to slave at step 811, completing the process of transferring its role of master to slave.

Should, however, the "I AM STILL PRESENT" message not be received from the slave unit selected to become the new master unit, then the current master unit waits until the next sub-period at step 812. If all sub-periods in this period have not been exhausted in the current period (see FIG. 4) as determined at decision step 813, the process loops back to step 808 where the query/response protocol is repeated. The master unit again waits to receive the "I AM STILL PRESENT" message from the slave unit selected to become the new master. If the message is not received and all the sub-periods for the period have been exhausted, the process loops back to decision step 802 to begin the process again, this time to select a different slave unit to become the new master unit.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking assets comprising the steps of:
   affixing a tracking unit to each asset to be tracked;
   establishing a mobile local area network of a plurality of tracking units in close proximity, each of said tracking units constituting a respective node of the mobile local area network; and
   each of said tracking units capability to independently determine and report its location to a central station and capability to communicate locally with other cooperative tracking units via the mobile local area network, said method further comprising the step of dynamically reconfiguring the mobile local area network so that other cooperative tracking units that come into proximity with the network can join the network, and tracking units that distance themselves from the network can leave the network; and
   identifying locations of tracked assets according to their connection in the mobile local area network where the exact location of at least one of the network nodes is known.

2. A method of tracking assets comprising the steps of:
   affixing a tracking unit to each asset to be tracked;
   establishing a mobile local area network of a plurality of tracking units in close proximity, each of said tracking units constituting a respective node of the mobile local area network;
   identifying locations of tracked assets according to their connection in the mobile local area network where the exact location of at least one of the network nodes is known;
   assigning one of the tracking units to function as a "master" and all others to function as "slaves", each of the master and slave tracking units having its own, respective, unique identification (ID);
   determining by the master tracking unit its own exact geographical position;
   reporting by the slave tracking units their ID's to the master tracking unit according to a local protocol without determining their own locations, so as to conserve power; and
   reporting by the master tracking unit to a central station the master tracking unit location and ID as well as the IDs of the other tracking units in the local area network.

3. A method of tracking assets comprising the steps of:
   affixing a tracking unit to each asset to be tracked;
   establishing a mobile local area network of a plurality of tracking units in close proximity, each of said tracking units constituting a respective node of the mobile local area network,
      issuing a "CALL FOR NEW MEMBERS" message by a first one of the tracking units acting as a "master unit";
      issuing an "I AM JOINING THE NETWORK" message by a second one the tracking units, said second one of the tracking units acting as a "slave unit"; and
      adding said second one of the tracking units to a slave list maintained by said first one of the tracking units; and
   identifying locations of tracked assets according to their connection in the mobile local area network where the exact location of at least one of the network nodes is known.

4. The method of tracking assets as recited in claim 3 further comprising the steps of:
   periodically issuing an "ARE YOU STILL PRESENT?" message by said first one of the tracking units; and
   responding to the "ARE YOU STILL PRESENT?" message by said second one of the tracking units by issuing an "I AM STILL PRESENT" message.

5. The method of tracking assets as recited in claim 4 further comprising the steps of:
   incrementing a failure count by said first one of the tracking units when an "I AM STILL PRESENT" message is not received from said second one of the tracking units in response to the "ARE YOU STILL PRESENT?" message;
   determining if the failure count exceeds a predetermined value; and
   removing said second one of the tracking units from said slave list when the failure count exceeds said predetermined value.

6. The method of tracking assets as recited in claim 5 further comprising the steps of:
   checking the slave list of said first one of the tracking units; and
   changing said first one of said tracking units to an autonomous state if the slave list is empty.

7. The method of tracking assets as recited in claim 3 further comprising the steps of:
   issuing a "SEARCHING FOR A NETWORK" message by a third one of said tracking units acting in an autonomous state;
   issuing an "AUTONOMOUS, JOIN THE NETWORK" message by said first one of the tracking units;
   issuing an "I AM JOINING THE NETWORK" message by said third one of the tracking units, said third one of the tracking units then assuming status of a slave unit; and
   adding said third one of the tracking units to said slave list.

8. The method of tracking assets recited in claim 3 further comprising the steps of:
   detecting by the master tracking unit a transmission from a second master tracking unit of a second network;
   determining if the two master tracking units have identical velocity profiles; and
   merging the two networks when the two master tracking units have identical velocity profiles by changing one of the two master tracking units to a new slave tracking unit of the other master tracking unit; and
   adding the new slave tracking unit to a slave list maintained by the other of the two master tracking units.

9. The method of tracking assets as recited in claim 8 wherein the step of merging the two networks includes the step of transmitting network information from the one master tracking unit to the other of the two master tracking units.

10. The method of tracking assets recited in claim 3 wherein each of said tracking units is battery powered, further comprising the steps of:

determining by the master tracking unit if the master tracking unit battery power is low and, if so, checking the slave list to select a slave tracking unit have a higher battery power; and transferring the role of master tracking unit to the selected slave tracking unit.

11. The method of tracking assets recited in claim 10 wherein the step of transferring the role of master tracking unit to the selected slave tracking unit comprises the steps of:

issuing by said first one of the tracking units a "SLAVE, BECOME MASTER" message;

changing states of the first and second ones of the tracking units from master to slave and from slave to master, respectively; and adding said first one of the tracking units to a slave list maintained by said second one of the tracking units.

* * * * *